United States Patent [19]

Sato

[11] Patent Number: 5,163,636
[45] Date of Patent: Nov. 17, 1992

[54] FISHING REEL WITH POSITION REGULATOR FOR DRAG CONTROL MEMBER

[75] Inventor: Jun Sato, Sakai, Japan

[73] Assignee: Shimano Industrial Co., Inc., Osaka, Japan

[21] Appl. No.: 627,837

[22] Filed: Dec. 17, 1990

[30] Foreign Application Priority Data

Dec. 18, 1989 [JP] Japan .................. 1-145562[U]

[51] Int. Cl.⁵ .............................................. A01K 89/02
[52] U.S. Cl. .................................... 242/268; 242/319; 277/935 D
[58] Field of Search ............... 242/268, 267, 319; 277/93 R, 935 D, 110, 112, 175, 173, 176, 91

[56] References Cited

U.S. PATENT DOCUMENTS

| | | | |
|---|---|---|---|
| 3,652,183 | 3/1972 | Pottharst, Jr. | 277/91 X |
| 3,765,689 | 10/1973 | Adams | 277/81 X |
| 4,223,854 | 9/1980 | Karlsson | 242/213 |
| 4,477,088 | 10/1984 | Picard | 277/93 X |
| 4,548,370 | 10/1985 | Noda | 242/218 X |
| 4,732,348 | 3/1988 | Young | 242/218 X |
| 4,815,676 | 3/1989 | Young | 242/219 |

*Primary Examiner*—Daniel P. Stodola
*Assistant Examiner*—Tony A. Gayoso
*Attorney, Agent, or Firm*—Dickstein, Shapiro & Morin

[57] ABSTRACT

A fishing reel has a reel body rotatably supporting a spool, a handle for applying a rotational force to the spool, a drag control member for adjustment of a braking force to be applied to the spool. The control member is disposed between a side frame of the reel body and the handle and is rotatable in unison with the handle. The improvement includes a position regulator mechanism for regulating a position of the drag control member axially relative to a handle shaft, while covering an outer periphery of the handle shaft inwardly of the control handle.

11 Claims, 5 Drawing Sheets

FISHING REEL WITH POSITION REGULATOR FOR DRAG CONTROL MEMBER

BACKGROUND OF THE INVENTION

1. Field of the Invention

The present invention relates to a fishing reel, and more particularly to a double-bearing type fishing reel including a drag control member disposed between a reel body side frame and a handle, with the drag control member being rotatable in unison with the handle.

2. Description of the Related Art

A typical conventional fishing reel of the above noted type is shown in FIG. 6. In this convention, a handle shaft S is rotatably supported via a stationary shaft G to a reel body side frame B which in turn rotatably supports a spool. A handle H is attached on the handle shaft S for transmitting a rotational drive force to the spool. The reel further includes a drag mechanism D having a plurality of drag braking plates disposed about the handle shaft S, so that the drag mechanism D may apply a braking force to the spool being rotated. For adjusting the braking force of this drag mechanism D, a drag control member A is screwed on the handle shaft S.

The drag control member A includes a cylindrical boss portion A1 screwed to a threaded portion N formed on a longitudinal end of the outer periphery of the handle shaft H and a plurality of control elements A2 projecting radially from the outer periphery of the boss portion A1. Further, between this drag control member A and the drag mechanism D, there are interposed a plurality of spacers C. In operation, with application of a manual rotational force, the drag control member A moves axially along the threaded portion N, thus adjusting the braking force of the drag mechanism D through the spacers C.

With the above-described manner of braking force adjustment, the axial movement of the drag control member A along the handle shaft S causes an axial gap between this drag control member A and the control handle S attached to the leading end of the handle shaft S, through which axial gap the threaded portion N of the handle shaft S becomes exposed to the ambience. And, any foreign substances such as water, dust or the like may easily come into contact with the exposed threaded portion N. This contact, if repeated and/or continued, will result in development of rust or accumulated adhesion of dust on the threaded portion N, thereby making the braking force adjustment through the drag control member A difficult or even impossible at all. Further, with the above-described convention, since the axial position of the drag control member A has to change with each braking force adjustment operation of the drag mechanism D by means of the drag control member A, a next adjustment operation tends to be troublesome.

With view to the above-described drawbacks of the convention, the primary object of the present invention is to provide an improvement over the convention, the improvement effectively preventing the occurence of axial gap between the drag control member and the handle associated with a rotational operation of the drag control member, the improvement also achieving great ease in operating the drag control member.

SUMMARY OF THE INVENTION

For accomplishing the above-noted object, a fishing reel related to the present invention, comprises: a reel body rotatably supporting a spool; a handle for applying a rotational force to the spool; a drag control member for adjustment of a braking force to be applied to the spool, the control member being disposed between a side frame of the reel body and the handle and being rotatable in unison with the handle; and position regulator means for regulating a position of the drag control member axially relative to a handle shaft, the regulator means covering an outer periphery of the handle shaft inwardly of the control handle.

Functions and effects of the above construction will now be described.

With the above-described construction, like the convention, adjustment of a braking force through the drag mechanism is effected by rotating the drag control member. In the course of this, the position regulator means regulates, i.e. restricts the axial position of the drag control member relative to the handle shaft and also an outer periphery of the handle shaft becomes covered at a position inward relative to the handle. With these functions combined, the rotational operation of the drag control member does not produce any axial gap between this control member per se and the handle, thus effectively preventing intrusion of foreign substance through such axial gap. Further, since the regulator means can fixedly maintain the axial position of the drag control member during the adjustment operation, a next adjustment operation can be carried out easily. In these ways, the invention has achieved the intended object of providing the improvement which can effectively prevent the occurence of axial gap between the drag control member and the handle associated with a rotational operation of the drag control member and which improvement also can achieve great ease in operating the drag control member. With these merits, the user can use this fishing reel for a long period of life without such trouble of unsmoothness due to the intrusion of dust or other foreign substances and can constantly carry out drag adjustment operation very easily.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a fishing reel related to the invention; in which.

DESCRIPTION OF THE PREFERRED EMBODIMENTS

Preferred embodiments of a fishing reel relating to the invention will now be described in particular with reference to the accompanying drawings.

Figure 1:
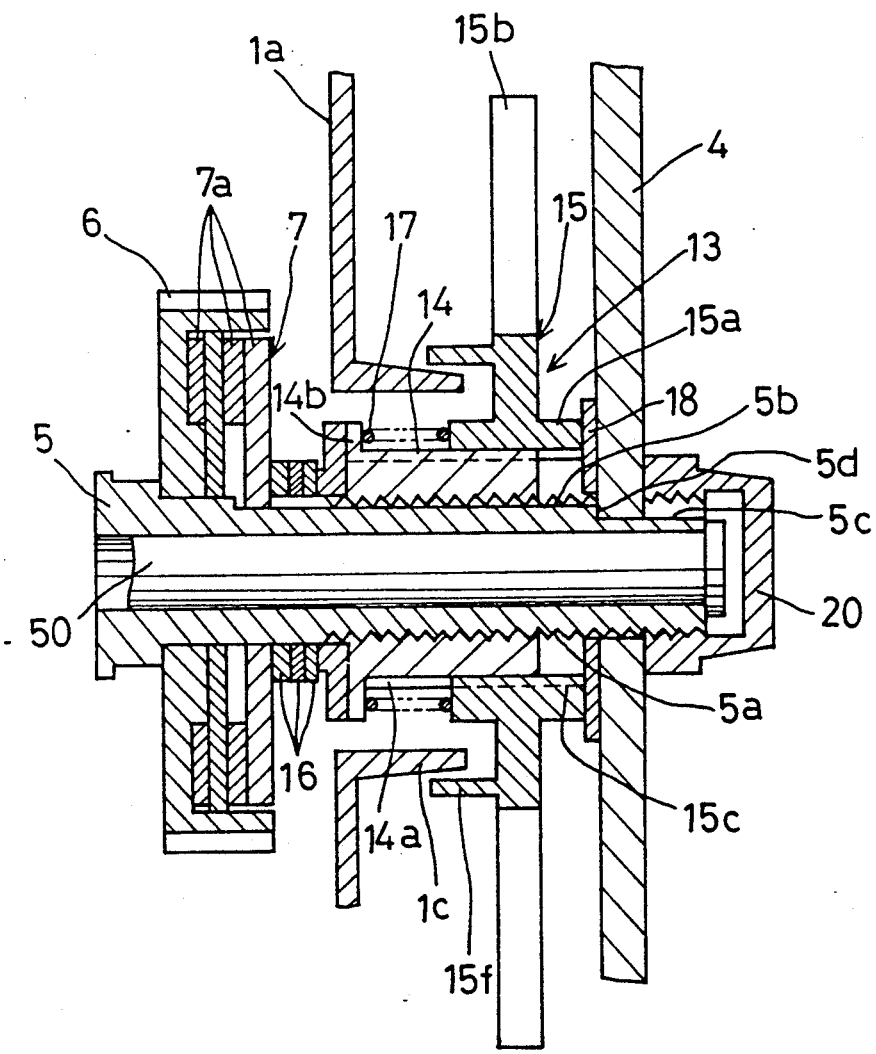
FIG. 1 is an enlarged section showing essential portions of a fishing reel according to one preferred embodiment of the invention.
Figure 2:
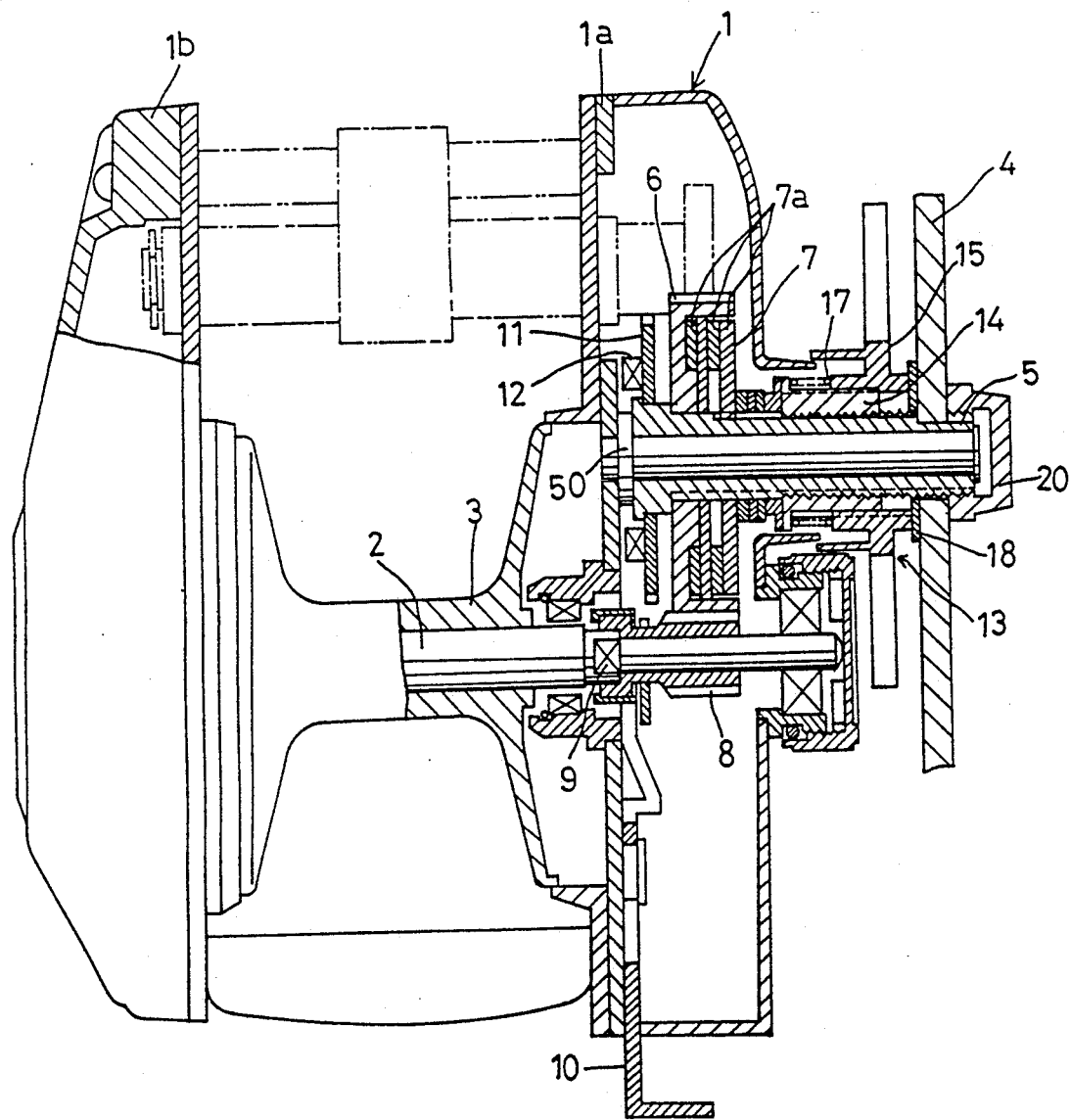
FIG. 2 is a partially cutaway front view showing an entire construction of the fishing reel of FIG. 1, FIGS. 3 through 5 are enlarged sections showing fishing reels of other embodiments of the invention.

As shown in FIG. 2, a fishing reel of the primary embodiment includes a reel body 1 having a pair of first and second side frames 1a and 1b, a spool 3 having a spool shaft 2, and a handle shaft 5 having a manual control handle 4, with the spool 3 and the handle shaft 5 being rotatably supported to the reel body 1. The handle shaft 5 loosely mounts a main gear 6 at an axially inward position thereof. Outwardly adjacent the main gear 6, there is provided a drag mechanism 7 comprised of a plurality of drag braking plates 7a. On the other hand, the spool shaft 2 slidably mounts a pinion gear 8 meshing the main gear 6. Further, between this pinion gear 8 and the spool shaft 2, there is interposed a clutch 9. Accordingly, as the handle 4 is rotatably driven, this rotational force is transmitted through the handle shaft 5, drag mechanism 7, main gear 6, pinion gear 8, clutch 9 and the spool shaft 2 and eventually to the spool 3 for rotating this. The handle shaft 5, adjacent its outer end, is rotatably supported to the first side frame 1a via a stationary shaft 50. Further, as best shown in FIG. 1, at the outer end of this handle shaft 5, there are formed a threaded portion 5a and a narrow flat face 5b and a wide flat face 5c provided across a stepped portion 5d, such that the handle 4 is fitted on the wide flat face 5c and fixed thereat by means of a nut 20.

Referring back to FIG. 2, the first side frame 1a movably supports a clutch lever 10 in such a manner that the lever 10 may move in and out of the interior formed by this first side frame 1a. More particularly, when this clutch lever 10 is pushed in, the pinion gear 8 is slided to actuate the clutch 9 for breaking power transmission. Also, the handle shaft 5 supports a return plate 12 having a clutch pin 11, such that a rotational operation of the handle 4 brings the clutch pin 11 into abutment against a leading end of the clutch lever 10 thus pushing out this clutch lever 10 for allowing the power transmission.

Between the handle 4 and the drag mechanism 7, there is interposed an adjustment mechanism 13 for adjusting a braking force of the drag mechanism 7.

This adjustment mechanism 13 includes a cylindrical adjuster member 14 movable along the axis of the handle shaft 5 for adjustment of the braking force and a control member 15 rotatable for causing the axial movement of the adjuster member 14. Between the adjuster member 14 and the drag mechanism 7, there are interposed a plurality of plate springs 16. In operation, as the control member 15 is driven to rotate, the adjuster member 14 moves along the axis of the handle shaft 5, thus adjusting the braking force of the drag mechanism 7 through the plate springs 16. Further, there is provided a position regulator means for regulating or restricting the position of the control member 15 axially relative to the handle shaft 5 and also for covering an outer peripheral portion of the handle shaft 5 inward relative to the handle 4.

In this embodiment shown in FIGS. 1 and 2, the cylindrical adjuster member 14 forms, in its inner periphery, an inner thread for screwed connection with the threaded portion 5a of the handle shaft 5. Further, the cylindrical adjuster member 14, forms, in its outer periphery, a spline 14a extending along the axis of the member 14. The control member 15 includes a cylindrical boss portion 15a and three control elements 15b extending radially from the outer periphery of the boss portion 15a. In the inner periphery of the boss portion 15a, there is defined a spline groove 15c movable relative to and engageable with the spline 14a. Accordingly, a rotary motion of the control member 15 causes rotation of the adjuster member 14 for moving this member 14 back and forth. Further, between an outer brim 14b disposed at a terminal end of the adjuster member 14 and an end face of the boss portion 15a, there is interposed a spring 17 for constantly urging the control member 15 towards the handle 4. This spring 17 serves to return the control member 15 towards the handle side relative to the adjuster member 14.

In this particular embodiment, the aforementioned position regulator means comprises a metal seat 18 large enough to face the end face of the boss portion 15a of the control member 15. This metal seat 18 is fitted on the handle shaft 5 between the handle 4 and the adjustment mechanism 13. Accordingly, the metal seat 18 has its axial movement restricted by the handle 4, and also the metal seat 18 is placed in abutment against the end face of the boss portion 15a of the control member 15 which effects a returning action by means of the urging force of the spring 17, thus regulating the axial position of the control member 15 relative to the handle shaft 5. With these arrangements, the outer periphery of the handle shaft 5 inwardly of the handle 4 can be shielded and no axial gap is produced between the control member 15 and the handle 4.

The functions and operations of the above-described construction will be more particularly described next.

For applying a braking force to the rotating spool 3 through the drag mechanism 7, the control member 15 is rotated via the control element 15b to the braking force increasing direction. Then, this rotational force is transmitted through the spline groove 15c defined in the boss portion 15a and the spline 14a meshing the spline groove 15c to the adjuster member 14 for rotating this. As the adjuster member 14 is rotated, the member 14 together with the control member 15 moves inwards and axially along the threaded portion 5a of the handle shaft 5. With this, the braking force of the drag mechanism 7 is adjusted for the force increasing side through the spacers 16. Upon completion of this braking force adjustment operation, as the user releases his finger from the control element 15b of the control member 15, the control member 15 automatically returns to its axially outward home position relative to the adjuster member 14 by means of the urging force of the spring 17. Then, as the boss portion 15a comes into abutment against the metal seat 18 acting as the position regulator means, the axial position of the control member 15 relative to the handle shaft 5 is restricted and eventually fixed at this restricted position. As the result, there occurs no axial gap between the control member 15 and the handle 4.

For adjusting the braking force of the drag mechanism 7 to the force decreasing side, the control member 15 is reversely rotated. During this reverse rotation, the control member 15 has its axial movement restricted because of the abutment between the end face of its boss portion 15a and the metal seat 18. Therefore, the reverse rotation of the control member 15 causes a sliding action between the spline groove 14c and the spline 14a, whereby the adjuster member 14 rotates towards the axially outward direction relative to the control member 15. With this too, there is produced no axial gap between the control member 15 and the handle 4.

The control member 15 employed in the foregoing embodiment of the present invention has no threaded portion. Therefore, this control member 15 can be formed of a relatively soft material such as resin. One obvious advantage of this is economy. Other advantages are ease of manufacturing, greater freedom in designing, and warm and comfortable feel (compared with a metallic material) to the user which will be particularly appreciated during use in winter season.

As described above, according to the fishing reel construction of the present invention, during a braking force adjustment operation of the drag mechanism 7, the position regulator means comprising the metal seat 18 in the foregoing embodiment can effectively restrict the axial position of the control member 15 relative to the handle shaft 5. Thus, there will occur no change in the axial position of this control member 15. Also, since no axial gap is produced between the control member 15 and the handle 4, there occurs no exposure to the ambience of the outer peripheral portion of the handle shaft 5 inwardly of the handle 4. Therefore, the construction can advantageously avoid development of rust, adhesion of accumulated dust or the like on the threaded portion 5a of the handle shaft 5. As the result, the braking force adjustment operation using the adjustment mechanism 13 can be carried out smoothly and reliably for a long period of life. Further, with the effective restriction of the axial position of the control member 15 relative to the handle shaft 5, braking force adjustment operations can be always carried out with ease. Furthermore, since the spring 17 is interposed between the boss portion 15a and the outward brim 14b, if the user accidentally drops this reel onto the ground thus applying a significant shock to the control member 15 from the handle 4, the spring 17 can act as a shock-absorber for protecting the control member 15 against damage.

In the foregoing embodiment, the position regulator means comprises the metal seat 18. Alternate constructions are possible as shown in FIGS. 3 and 4, where the end face of the boss portion 15a of the control member 15 is placed in direct abutment against an inside face of the handle 4 thus restricting the axial position of the control member 15 relative to the handle shaft 5 and shielding the outer peripheral portion of the handle shaft 5 inwardly of the handle 4.

Figure 3:
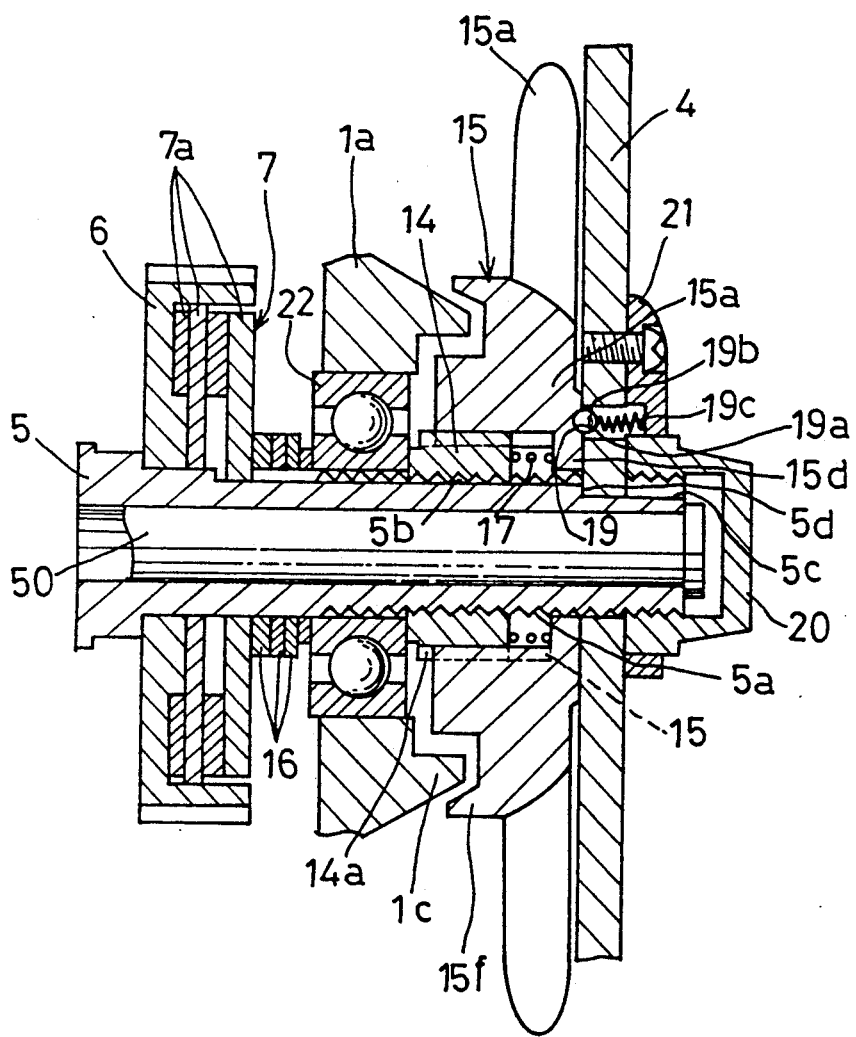

More particularly, in the alternate embodiment of FIG. 3, the outward brim 14b is eliminated while an inward brim 15d is provided to the boss portion 15a and the spring 17 is interposed between the inward brim 15d and the end face of the adjuster member 14. Further, a click mechanism 19 is provided between the boss portion 15a and the handle 4 so that the mechanism 19 produces a clicking sound and feel to the user in association with rotation of the control member 15. This click mechanism 19 consists essentially of a plurality of concave engaging parts 19a and a single engaging member 19b engageable with one of the parts 19a. The engaging parts 19a are formed in the boss portion 15a whereas the engaging member 19b is supported to the handle 4. This handle 4 defines a through hole 4a through which the engaging member 19 and an urging spring 19 are supported. One terminal end of this spring 19 is received by antirotation plate 21 of the nut 20. Further, between the adjuster member 14 and the plate spring 16, a bearing 22 is axially movably interposed for supporting the handle shaft 5 to the side frame 1a.

Figure 4:
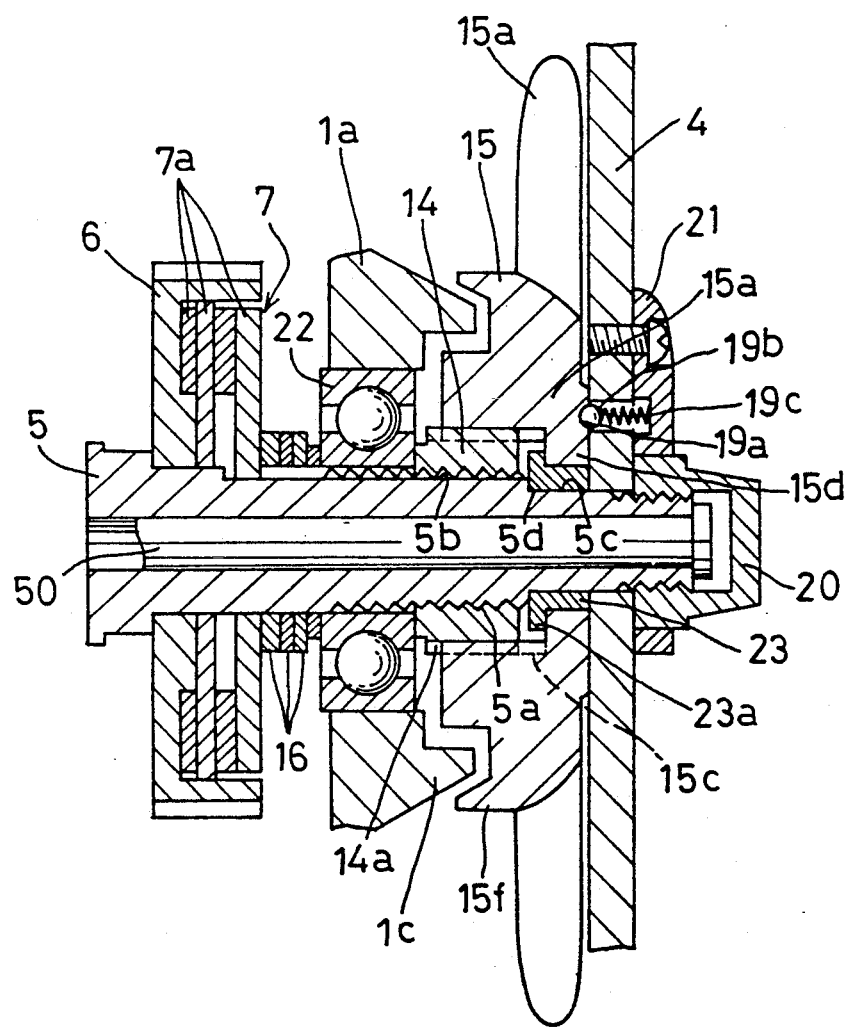

In the further embodiment of FIG. 4, the spring 17 is eliminated; whereas, a bush 23 having an outward brim 23a is engaged with the wide flat face 5c of the handle shaft 5. Then, between the outward brim 23a of the bush 23 and the handle 4, the inward brim 15d of the control member 15 is rotatably interposed. Further, in this embodiment of FIG. 4 as well as that of FIG. 3, the click mechanism 19 and the bearing 22 are employed.

In all the foregoing embodiments, the adjuster member 14 of the adjustment mechanism 13 is screwed to the threaded portion 5a of the handle shaft 5 and the control member 15 is supported on the outer periphery of the adjuster member 14 unrotatably but movably relative thereto. Instead, a modified construction is conceivable as shown in FIG. 5.

Figure 5:
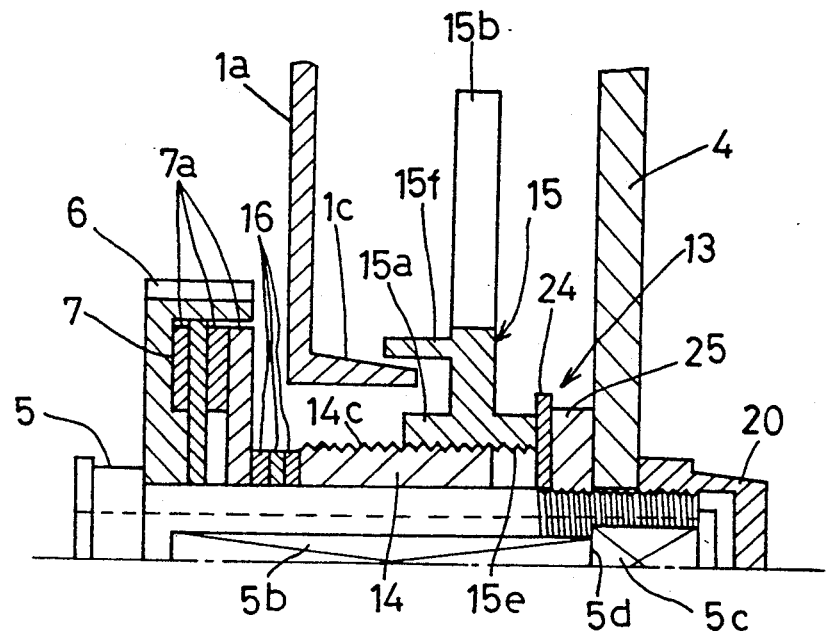
Figure 6:
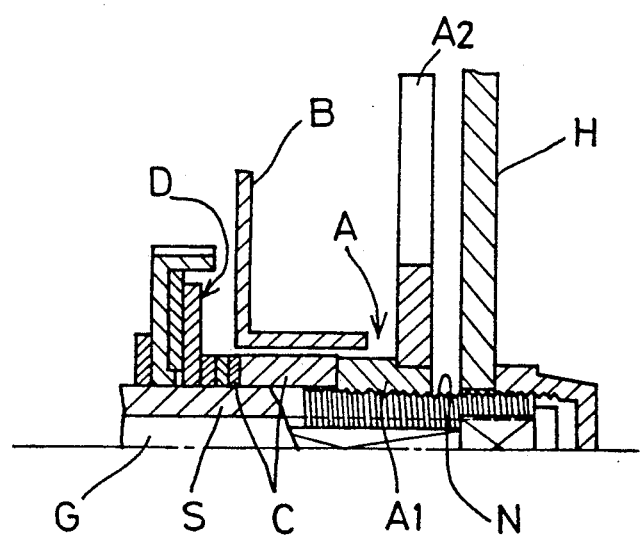
FIG. 6 is a section showing a conventional fishing reel.

In this further embodiment of FIG. 5, the inner peripheral face of the adjuster member 14 is formed as a non-circular shape corresponding to a sectional shape of the narrow flat face 5b of the handle shaft 5, so that the adjuster member 14 is supported to the narrow flat face 5b of the handle shaft 5 unrotatably while axially movably relative thereto. The adjuster member 14 defines, in its outer periphery, a threaded portion 14c while the boss portion 15a of the control member 15 defines, in its inner periphery, an associated inner threaded portion 15e engageable with the threaded portion 14c, such that the adjuster member 14 effects an axial relative movement in connection with rotation of the control member 15. Further, the position regulator means, in this embodiment, comprises a metal seat 24 unrotatably engageable with the narrow flat face 5b of the handle shaft 5 and a nut 25 screw-engageable with the threaded portion 5a of the handle shaft 5.

According to the above-described construction, in applying a braking force to the rotating spool 3 through the drag mechanism 7, when the control member 15 is rotated through the control element 15b for increasing the braking force, the control member 15 is rotated relative to the adjuster member 14 while having its axial movement restricted through the abutment between the end face of the boss portion 15a of the control member 15 and the metal seat 18. With this rotation of the control member 15, the adjuster member 14 effects a relative movement inwardly, whereby the braking force of the drag mechanism 7 is adjusted for the increasing side through the plate springs 16. In the course of the above, since the control member 15 effects the rotation while constantly maintaining its abutment against the metal seat 24 of the position regulator means, there is produced no axial gap between this control member 15 and the handle 4. Conversely, if the control member 15 is reversely rotated for decreasing the braking force of the drag mechanism 7, the control member 15 effects an axial inward movement while being rotated relative to the adjuster member 14, whereby the propelling force of the adjuster member 14 by means of the control member 15 is decreased, which results in reduction in the pressing force of the drag braking plates 7a of the drag mechanism 7. Accordingly, the plate springs 16 are urged to return to their original position and this combined returning force causes the adjuster member 14 to axially move inwardly; then, the boss portion 15a of the control member 15 screwed to this adjuster member 14 comes into abutment against the metal seat 24. Thus, in this case too, there is produced no axial gap between the control member 15 and the handle 4.

As described above, according to the construction of this embodiment too, when the braking force of the drag mechanism 7 is adjusted through rotation of the control member 15, no change occurs in the axial position of the control member 15 relative to the handle shaft 5 and also no axial gap is produced between the control member 15 and the handle 4. Thus, no outer peripheral portion of the handle shaft 5 inwardly of the handle 4 is exposed to the ambience. Further, since the control member 15 is constantly placed in abutment against the metal seat 24 of the position regulator means, a next braking force adjustment operation can be effected troublelessly. Moreover, since the propelling force resulting from the rotation of the control member 15 is received by the nut 25 through the seat metal 24, i.e. not directly by the handle 4, this construction is advantageous also for effectively preventing e.g. deformation of the handle 4. Incidentally, in this embodiment of FIG. 5, it is also conceivable to eliminate the metal seat 24 and the nut 25 while bringing the end face of the boss portion 15a of the control member 15 into direct abutment against the inside face of the handle 4 thereby restricting the axial position of the control member 15 relative to the handle shaft 5 while covering the outer peripheral portion of the handle shaft 5 inwardly of the handle 4.

Further, in the embodiments of FIGS. 1 through 5, preferably, at the boss portion 15a of the control member 15, there is provided a cylindrical portion 15f overlapping with a cylindrical element 1c projecting outwardly from the first side frame 1a.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A fishing reel comprising:
a reel body rotatably supporting a spool;
a handle for applying a rotational force to the spool;
a drag control member for adjustment of a braking force to be applied to the spool, said control member being disposed between a side frame of the reel body and the handle and being rotatable in unison with the handle;
position regulator means for regulating a position of the drag control member axially relative to a handle shaft, said regulator means covering, in cooperation with said drag control member, an outer periphery of said handle shaft inwardly of said handle such that there is no axial gap between said control member and said handle, such that said outer periphery of said handle shaft is not exposed to the ambience; and
an adjuster member engaged with said outer periphery of said handle shaft, an outer periphery of said adjuster member being engaged with an inner surface of said drag control member, said adjuster member being non-rotatable with respect to said drag control member, and said adjuster member and said drag control member being displaceable in the axial direction relative to said handle shaft so as to permit the adjustment of the braking force.

2. A fishing reel according to claim 1, wherein said position regulator means comprises a metal seat large enough to face a boss portion formed on said drag control member.

3. A fishing reel according to claim 2, wherein said drag control member is comprised essentially of said boss portion and a plurality of control elements projecting radially from an outer periphery of said boss portion.

4. A fishing reel according to claim 3, wherein said outer periphery of said adjuster member is splined with an inner periphery of said boss portion for associating said adjuster member with rotation of said drag control member, a spring being interposed between an end of said boss portion and a brim portion formed at an end of said adjuster member so as to constantly urge said drag control member towards said handle.

5. A fishing reel according to claim 1, wherein said position regulator means regulates the axial position of said drag control member relative to said handle shaft and covers the outer periphery of said handle shaft inwardly of said handle by bringing an end face of a boss portion formed on said drag control member into direct abutment against an inside face of said handle.

6. A fishing reel according to claim 5, wherein a spring is interposed between an inward brim portion formed at said boss portion facing said handle shaft and an end of said adjuster member facing said handle so as to constantly urge said drag control member towards said handle.

7. A fishing reel according to claim 6, wherein a click mechanism is provided between said boss portion of the drag control member and said handle so as to produce a clicking sound in association with rotation of said drag control member.

8. A fishing reel according to claim 1, wherein a bush having an outward brim is fitted on said handle shaft so as to place said drag control member in constant abutment against said handle, an inward brim of said drag control member being rotatably interposed between said outward brim of the bush and said handle.

9. A fishing reel according claim 8, wherein a click mechanism is provided between said boss portion of the drag control member and said handle so as to produce a clicking sound in association with rotation of said drag control member.

10. A fishing reel according to claim 1, wherein said position regulator means is essentially comprised of a metal seat unrotatably fitted on said handle shaft and a nut screw-engageable with a threaded portion of said handle shaft.

11. A fishing reel according to claim 10, wherein said drag control member includes a cylindrical boss portion and a plurality of control elements projecting radially from an outer periphery of said boss portion.

* * * * *